(12) United States Patent
Ginetti et al.

(10) Patent No.: US 10,496,772 B1
(45) Date of Patent: Dec. 3, 2019

(54) SYSTEMS AND METHODS FOR DYNAMICALLY GENERATING HIERARCHICAL ROTATING PCELLS FROM A STATIC INTEGRATED CIRCUIT DESIGN

(71) Applicant: CADENCE DESIGN SYSTEMS, INC., San Jose, CA (US)

(72) Inventors: Arnold Ginetti, Antibes (FR); Jean-Noel Pic, Valbonne (FR)

(73) Assignee: Cadence Design Systems, Inc., San Jose, CA (US)

(*) Notice: Subject to any disclaimer, the term of this patent is extended or adjusted under 35 U.S.C. 154(b) by 113 days.

(21) Appl. No.: 15/847,566

(22) Filed: Dec. 19, 2017

(51) Int. Cl.
*G06F 17/50* (2006.01)

(52) U.S. Cl.
CPC ...... *G06F 17/5045* (2013.01); *G06F 2217/02* (2013.01); *G06F 2217/04* (2013.01); *G06F 2217/06* (2013.01)

(58) Field of Classification Search
CPC ............. G06F 17/5045; G06F 17/5068; G06F 17/5081
USPC ........................................ 716/100, 101, 102
See application file for complete search history.

(56) References Cited

U.S. PATENT DOCUMENTS

| | | | | |
|---|---|---|---|---|
| 7,698,662 B1* | 4/2010 | Wu et al. | ............ | G06F 17/5068 716/104 |
| 8,046,730 B1* | 10/2011 | Ferguson et al. | ... | G06F 17/5068 716/100 |
| 9,330,219 B2* | 5/2016 | Yang et al. | ......... | G06F 17/5068 |
| 9,690,893 B1* | 6/2017 | Ferguson et al. | ... | G06F 17/5072 |
| 2008/0016476 A1* | 1/2008 | Chan | ................... | G06F 17/5068 716/122 |
| 2013/0298092 A1* | 11/2013 | Ting et al. | .............. | G06F 19/00 716/102 |
| 2017/0046470 A1* | 2/2017 | Allamraju et al. | .......................... | G06F 17/5036 |

\* cited by examiner

*Primary Examiner* — Sun J Lin
(74) *Attorney, Agent, or Firm* — Eric L. Sophir; Dentons US LLP

(57) ABSTRACT

Disclosed herein are embodiments for generating hierarchical rotating pcells (parametrized cells) design from a user provided static hierarchical design. An EDA (Electronic Design Automation) tool may receive a hierarchical static design and allow the user to instantiate a top level hierarchical rotating pcell using one or more parameters including an angle parameter to indicate a rotation angle. Based on the one or more parameters, the EDA tool may recursively identify, in the user's static hierarchical design, lower level static cells and replace them with the hierarchical rotating pcells based on the angle parameter in the already instantiated upper level hierarchical rotating pcells. The EDA tool may instantiate and re-instantiate hierarchical rotating pcells until leaf-level cells have been reached to dynamically generate an IC (integrated circuit) design with hierarchical rotating pcells from the user's static hierarchical design such that rotation can be accomplished without flattening the IC design.

20 Claims, 8 Drawing Sheets

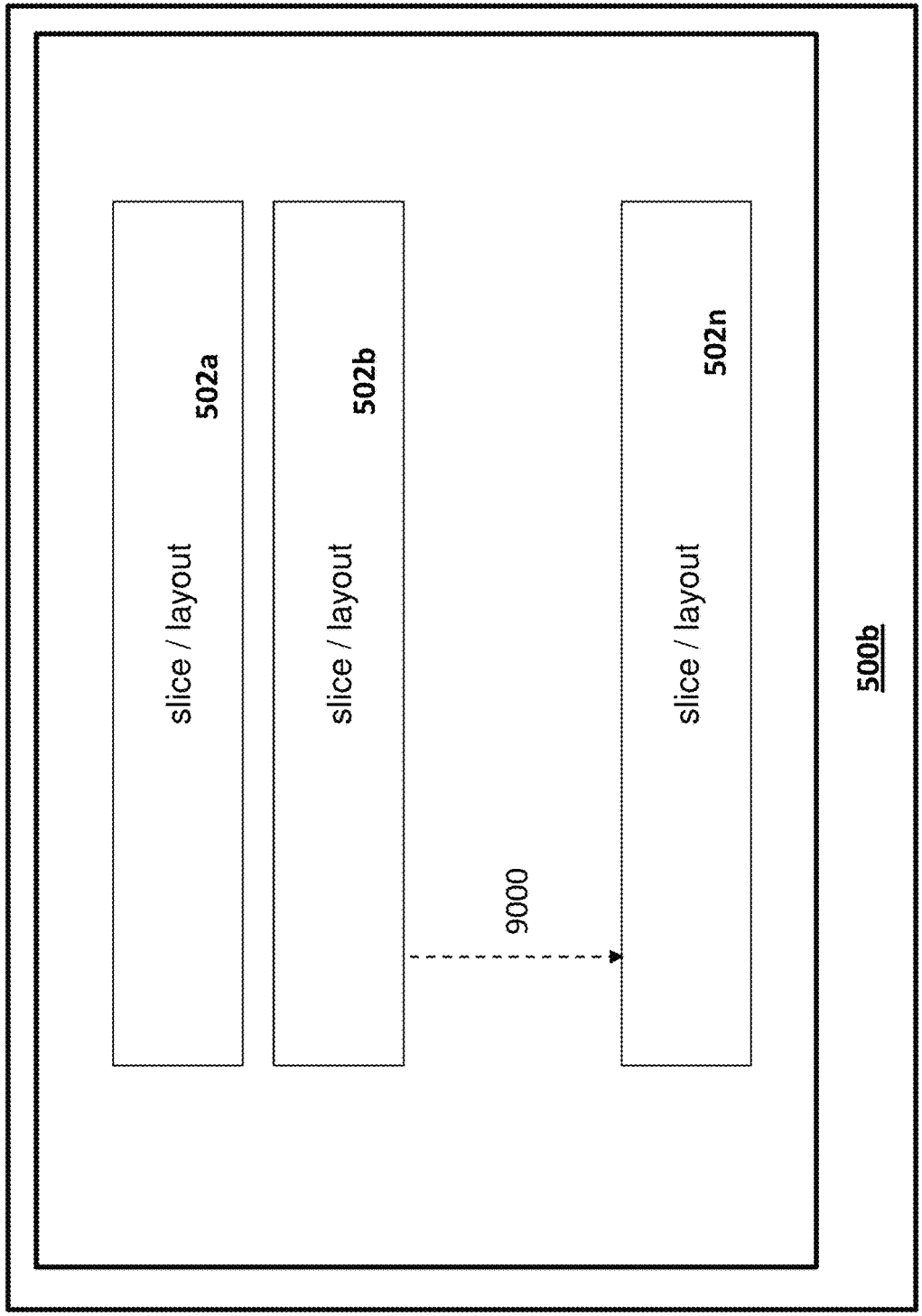

SYSTEMS AND METHODS FOR DYNAMICALLY GENERATING HIERARCHICAL ROTATING PCELLS FROM A STATIC INTEGRATED CIRCUIT DESIGN

TECHNICAL FIELD

This application relates generally to integrated circuit (IC) design, and more specifically to dynamically generating hierarchical rotating pcells from a static IC design.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based Electronic Design Automation (EDA) tools for schematics, layouts, simulation, and verification of the complex circuits. The EDA tools provide various graphical user interfaces (GUIs) and text based interfaces to allow circuit designer to modify a schematic or a layout based design to generate a functioning and optimized circuit schematic or layout.

EDA tools typically use instances of programmable or parameterized or parameterizable cells (shortened as pcell for a singular instance or pcells for plural instances) to form an electronic circuit design. A pcell includes parameters to represent circuit components such as a transistor. Furthermore, pcells can represent other circuit devices such as logic gates, memory devices, and/or transmission lines. A circuit designer may therefore may instantiate various pcells and connect the instantiated pcells to generate a design of an IC or a part thereof.

As mentioned above, a circuit designer may use an EDA tool to modify an IC design. For example, in the context of pcells or any other type of cell based design, the circuit designer may have to move or rotate the cells. Furthermore, the pcells (or any other type of cells) may be arranged hierarchically, and the children pcells may have to be rotated with the parent pcells. However, conventional EDA tools do not provide instance rotation functionality. The conventional EDA tools are confined geometrical rotations. For example, in a hierarchical design with multiple levels of cells and geometrical shapes at the leaf level; a conventional EDA tool has to completely flatten the design to reach the geometrical shapes. Once the conventional EDA tool reaches the leaf level by flattening the design instance, the conventional EDA tool may merely rotate the geometrical shapes. However, the conventional EDA tool does not have a notion of rotating the pcell instance itself. Furthermore, the conventional method of completely flattening the design due the lack the instance rotation functionality presents a large computational and memory overload for the conventional EDA tools.

SUMMARY

What is therefore desired is a significant improvement upon the conventional EDA tools to provide functionality to rotate an instance. What is further required is a system and method to dynamically generate hierarchical rotating pcell based design from a user provided static hierarchical design, which the user can rotate hierarchical rotating pcell.

Embodiments disclosed herein attempt to solve the aforementioned problems and other technological problems. The embodiments disclosed herein describe systems and methods that intelligently generate hierarchical rotating pcells design from a user provided static hierarchical design. In particular, an EDA tool may receive a hierarchical static design and allow the user to instantiate the top level rotating pcell using one or more parameters including an angle parameter to indicate a rotation angle. Based on the one or more parameters, the EDA tool may recursively identify, in the user's static cell based design, lower level static cells and replace them with the hierarchical rotating pcells based on the angle parameter in the already instantiated upper level hierarchical rotating pcells. The EDA tool may instantiate and re-instantiate hierarchical rotating pcells until the leaf-level cells have been reached to dynamically generate an IC design with hierarchical rotating pcells from the user's static design. The rotatable hierarchical pcells IC design supports instance rotation and therefore the IC design does not have to be flattened during rotation.

In an embodiment, a computer implemented method comprises instantiating, by the computer, a hierarchical rotating parametrized cell based on a first set of parameters to generate a first level hierarchical rotating parametrized cell; retrieving, by the computer system using at least one parameter of the first set of parameters, a first level shape from a master of a first level static cell of a static hierarchical integrated circuit (IC) design; rotating, by the computer system, the retrieved first level shape within the first level hierarchical rotating parametrized cell based on an angle parameter; determining, by the computer system, that the first level static cell contains a second level static cell, wherein the second level is hierarchically below the first level; retrieving, by the computer system, a second level shape and second set of parameters from a master of a second level static cell of the static hierarchical IC design; reinstantiating, by the computer, the hierarchical rotating parametrized cell based on the second set of parameters to generate the second level hierarchical rotating parametrized cell; and rotating, by the computer system, the retrieved second level shape within the second level hierarchical rotating parametrized cell based on the angle parameter.

In another embodiment, a system for generating hierarchical rotating parametrized cells comprises: one or more computers comprising a non-transitory machine-readable media configured to store a plurality of records of a plurality of circuit components forming a at least a portion of an integrated circuit (IC) design; and at least one computer of the one or more computers, the at least one computer coupled to the non-transitory machine readable media storing the plurality of records and comprising a processor configured to: instantiate a hierarchical rotating parametrized cell based on a first set of parameters to generate a first level hierarchical rotating parametrized cell; retrieve, using at least one parameter of the first set of parameters, a first level shape from a master of a first level static cell of a static hierarchical IC design; rotate the retrieved first level shape within the first level hierarchical rotating parametrized cell based on an angle parameter; determine that the first level static cell contains a second level static cell, wherein the second level is hierarchically below the first level; retrieve a second level shape and second set of parameters from a master of a second level static cell of the static hierarchical IC design; reinstantiate the hierarchical rotating parametrized cell based on the second set of parameters to generate the second level hierarchical rotating parametrized cell; and rotate the retrieved second level shape within the second level hierarchical rotating parametrized cell based on the angle parameter.

In another embodiment a computer readable non-transitory medium contains one or more computer instructions, which when executed by a processor cause the processor to: receive an instantiation of a top level hierarchical rotating parametrized cell corresponding to a top level static cell of a hierarchical static integrated circuit (IC) design; receive an angle parameter by which a hierarchical rotating parametrized cell based IC design corresponding to the static IC design should be rotated; recursively identify, lower level static cells in the static IC design and recursively generate a corresponding hierarchical rotating parametrized cell for each of the lower level static cells; and recursively rotate each corresponding hierarchical rotating pcell based on the angle parameter.

BRIEF DESCRIPTION OF THE DRAWINGS

The accompanying drawings constitute a part of this specification and illustrate embodiments of the subject matter disclosed herein.

FIG. 5B shows an updated exemplary GUI rendering a level_one layout display showing middle level hierarchical rotating pcells, according to an exemplary embodiment.

DETAILED DESCRIPTION

Figure 1:
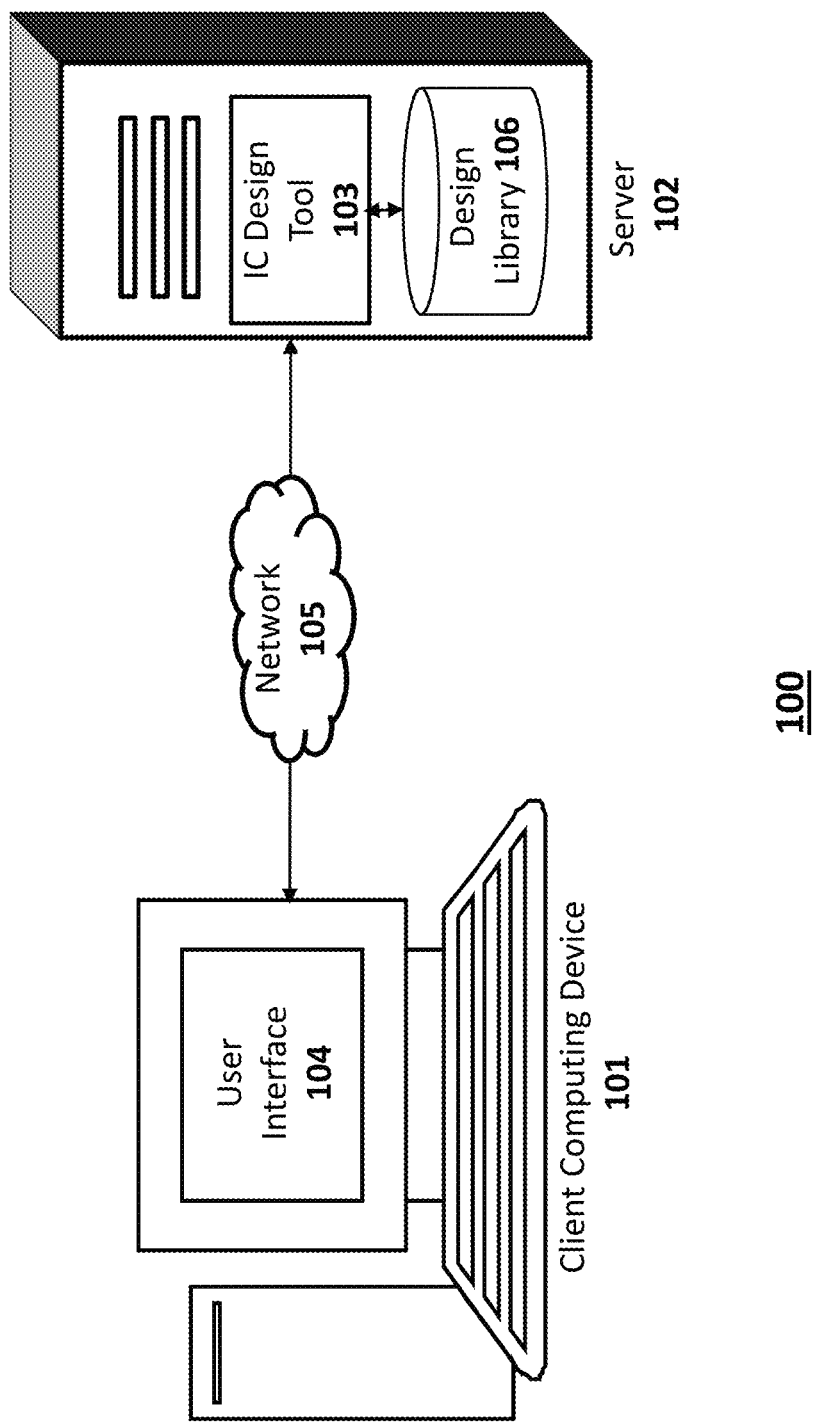
FIG. 1 shows an exemplary system for generating hierarchical rotating pcells, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods that intelligently generate hierarchical rotating pcells based design from a user provided static cell based hierarchical design. All of the instances within the hierarchical rotating pcells based design are readily rotatable based on a user-provided angle parameter with a very low memory cost compared to a conventional approach to completely flatten the design for a leaf-level geometrical rotation. All the user has to do is instantiate the top level hierarchical pcell with the parameters identifying the top level static pcell in the user's design. Based on the user's instantiation, a system may recursively traverse through each node (containing a static cell) and instantiating a hierarchical rotating pcell for each static pcell. Furthermore, the system may rotate each hierarchical rotating pcell in the IC design based on an angle parameter provided by the user. In addition, the system may rotate the location of each of the hierarchical rotating pcells within the corresponding parent submaster such that the hierarchical rotating pcells are instantiated at the correct location.

FIG. 1 illustrates an electronic design automation (EDA) system 100, according to an exemplary embodiment. The electronic design automation system 100 may include any number of computing devices; the exemplary embodiment may include a client computing device 101 and a server 102. One or more components of the electronic design automation system 100 may be grouped and referred to as an electronic design automation tool (or EDA tool in short). The client 101 may be connected to the server 102 via hardware and software components of one or more networks 105. In some embodiments, the system 100 may be a cloud-based system wherein one or more functionalities of the system 100 may be performed by one or more cloud computing devices. A network 105 may also connect various computing devices with databases or other components of the system 100. Examples of the network 105 include, but are not limited to, Local Area Network (LAN), Wireless Local Area Network (WLAN), Metropolitan Area Network (MAN), Wide Area Network (WAN), and the Internet. The communication over the network 105 may be performed in accordance with various communication protocols, such as Transmission Control Protocol and Internet Protocol (TCP/IP), User Datagram Protocol (IMP), and IEEE communication protocols.

A client device 101 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client device 101 may be configured to communicate with one or more servers 102 of the system 100 through one or more networks 105, using wired and/or wireless communication capabilities. A user interface 104 may include a Graphical User Interface (GUI) that renders an interactive, graphical representation of an IC design, layout, schematic, or other logical representation of an IC that is being designed and optimized using an IC design tool 103. The GUI 104 may provide interactive elements, such as graphical representations of IC design elements (e.g., pcell instances), for a user to manipulate the IC design layout. In some embodiments, the user interface 104 may include a text based interface allowing the user to enter manual commands for designing and optimizing the IC. Although this disclosure uses the generic term IC design tool, one having ordinary skill in the art should understand that the embodiments used herein are applicable to package design tools (detailed below) and printed circuit board (PCB)

design tools. One having ordinary skill in the art should further understand that package design tools and PCB design tools may also be provided in the same system 100. In other words, the generic term IC design tool has been used for brevity and not with the intention to limit the scope this disclosure.

A server 102 may be accessible to the client device 101 via one or more networks 105. The server 102 may be any computing device comprising a processor and other computing hardware configured to execute an IC design tool 103 software module (e.g., EDA design software) that may analyze and optimize an IC design. In operation, using a client device 101 to access a design tool 103 hosted on a server 102 over a network 105, a circuit designer may interact with the IC design tool 103, through a number of input devices of the client device 101, such as by inputting a selection as with a mouse or inputting a request as with a keyboard. The IC design tool 103 may generate any number of graphical interface 104 responses based on the inputs received from the client device 101, and then send the data back to the client device 101 to be rendered on the GUI 104.

The server 102 may execute one or more component software modules of the IC design tool 103 software program, which may be a software program that allows users (e.g., engineers, circuit designers) to design and optimize circuit designs through software modules. The IC design tool 103 may provide users with interactive design interfaces 104 for designing an IC and the various design elements, execute automated optimization processes, and execute automated layout-generation processes. The server 102 may comprise, or may be in networked-communication with, non-transitory machine-readable media configured to store a netlist of or any other file including records of IC design elements, which may be a machine-readable computer file or a design database containing one or more records of design elements (e.g., circuit devices, pcells) of the IC design. In operation, the IC design tool 103 may analyze and optimize the design elements of the netlist or any other type of file associated with the IC design. Non-limiting examples of circuit devices may include memory devices (e.g., flip-flops, registers), combination logic gates (e.g., AND, OR, NOT, NOR, NAND, XOR), and multiplexers, among others. The netlist or any other type of file may also include records of a plurality of nets. The nets may be the records associated with the wires interconnecting the plurality of circuit devices.

The server 102 may include a design library 106 that is accessed by the IC design tool 103. The design library 106 may include instances of various circuit devices, for example, transistors used to layout an IC. In some embodiments, the design library 106 may include instances of pcells used by the IC design tool 103 to generate an IC layout. An instance of a pcell may represent electronic circuit components such as a transistor, transmission line, or an optical fiber line. The IC design tool 103 may use instances of pcells in the design library 106 to generate a netlist of an IC that can be sent to a manufacturing facility for fabrication.

The exemplary system 100 is shown in FIG. 1 as comprising only one server 102 for ease of explanation. However, it should be appreciated that the system 100 may comprise a number of servers 102. In some embodiments, the system 100 may comprise multiple interconnected, networked servers 102, some of which may execute various software modules configured to manage and control the resources and performance of the system 100. In some embodiments, the servers 102 may have parallel architectures configured to support multi-threading on multi-core workstations to handle large designs. In such embodiments, the servers 102 may be configured for distributed processing. The server 102 may be logically and physically organized within the same or different devices or structures, and may be distributed across any number of physical structures and locations (e.g., cabinets, rooms, buildings, cities).

The exemplary system 100 may implement pcells to generate an IC design. In some implementations, the pcells may be schematic pcells forming an IC schematic design. In other implementations, the pcells may be layout pcells forming an IC layout design. The exemplary system 100 may support interchangeability of the schematic pcells and layout pcells such that a user (such as a circuit designer) may switch between schematic view and layout view.

The pcells, be it schematic or layout pcells, may be hierarchical rotating pcells, which support any angle rotation while maintaining the hierarchy of the design. In a conventional cell based design, any rotation has to be based on completely flattening the design such that the leaf level geometry can be rotated. In other words, the instances of the conventional cells cannot be rotated: the conventional cells merely allow geometrical rotation. The hierarchical rotating pcells may allow a circuit designer to seamlessly rotate all of the instances within a design without destroying the hierarchy.

In operation, the exemplary system 100 may intelligently generate a hierarchical rotating pcells based design from a user provided static hierarchical cell based design. The use may instantiate the root level or top level hierarchical rotating pcell providing parameters of the master of the top level original static cell and an angle parameter for rotation. The system 100 may execute a SKILL code (or any other type of code) in the top level hierarchical rotating pcell to copy the top level shape and rotate the shape by the angle parameter. The exemplary system 100 may further encounter other static instances in the top level static cell and recursively reinstantiate a hierarchical rotating pcell for every instance until the user's IC design is completely traversed.

Figure 2:
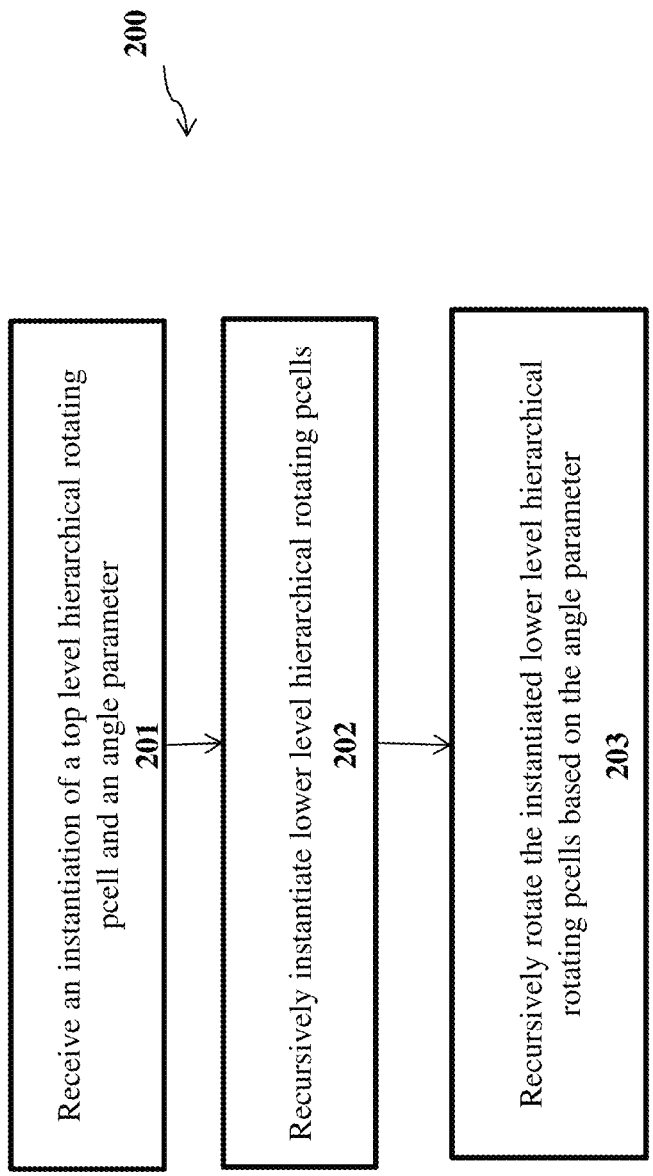
FIG. 2 shows an exemplary method for generating hierarchical rotating pcells, according to an exemplary embodiment.

FIG. 2 shows an exemplary method 200 of generating hierarchical rotating pcells, according to an exemplary embodiment. Although multiple computer systems and multiple databases may implement the various steps of the exemplary method 200, the following describes, for brevity, a computer system and a database implementing the method 200. Furthermore, one having ordinary skill in the art understands that the method 200 may implement other alternative or additional steps than the one described below, and may skip one or more of the steps described below.

In a first step 201, the computer system may receive an instantiation of a top level hierarchical rotating pcell and an angle parameter. In some implementations, the computer system may further receive a hierarchical static integrated circuit (IC) design with the instantiation of the top level hierarchical rotating pcell and the angle parameter. In other implementations, the computer system may otherwise associate the instantiated top level hierarchical rotating pcell with static IC design based on a data field within the top level hierarchical rotating pcell.

In a next step 202, the computer system may recursively instantiate lower level hierarchical rotating pcells. After the instantiation of the top level hierarchical rotating pcell, the computer system may determine that the corresponding top level static cell in the static IC design contains lower level static cells. The computer system may recursively traverse through the static cells and intelligently instantiate corresponding hierarchical rotating pcell. The recursive process may stop when computer system encounters a leaf-level static cell.

In a concurrent or a next step 203, the computer system may recursively rotate the instantiated lower level hierarchical rotating pcells based on the angle parameter. Using the angle parameter, the computer system may first rotate the location of a lower level hierarchical rotating pcell to account for the rotation of the parent hierarchical pcell of the lower level hierarchical pcell. Furthermore, the computer system may rotate the shape of the lower level hierarchical rotating pcell by the angle parameter.

Therefore, the computer system may automatically and intelligently generate a hierarchical rotating pcell based IC design from a static IC design using the aforementioned recursive steps of the method 200. All the circuit designer has to do is to instantiate a top level hierarchical rotating pcell and provide an angle parameter, and the computer system intelligently performs the back-end processing to generate the entire IC design using hierarchical rotating pcells.

Figure 3:
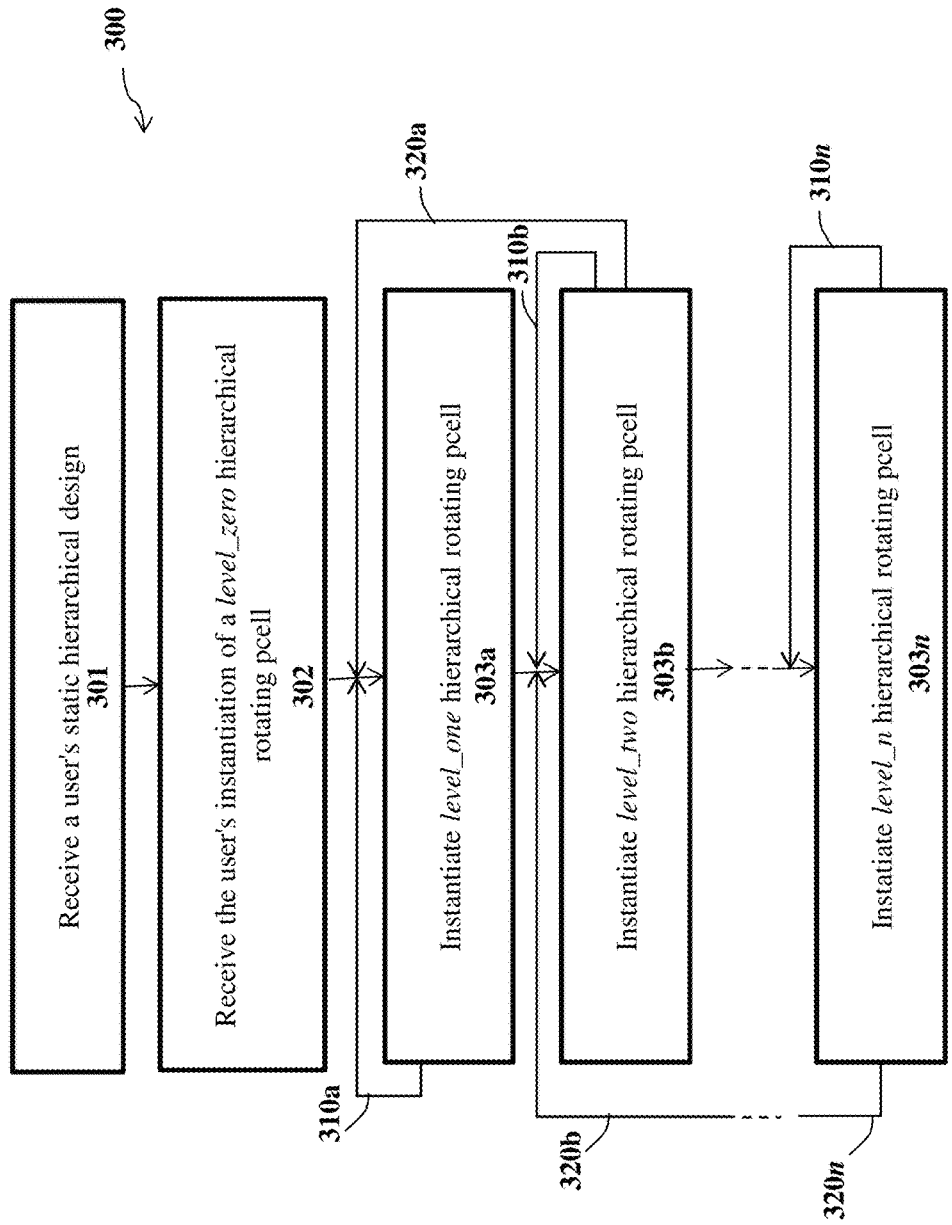
FIG. 3 shows an exemplary method for generating hierarchical rotating pcells, according to an exemplary embodiment.

FIG. 3 shows an exemplary method 300 of generating hierarchical rotating pcells, according to an exemplary embodiment. Although multiple computer systems and multiple databases may implement the various steps of the exemplary method 300, the following describes, for brevity, a computer system and a database implementing the method 300. Furthermore, one having ordinary skill in the art understands that the method 300 may implement other alternative or additional steps than the one described below, and may skip one or more of the steps described below.

In a first step 301, the computer system may receive a user's static hierarchical integrated circuit (IC) design. In some embodiments, the user may upload a file containing the user's static hierarchical IC design into the memory of the computer system. In other embodiments, the computer system may provide a graphical and/or text-based design interface for the user to generate the static hierarchical IC design. In some instances, the static hierarchical IC design may be a schematic design containing schematic IC components. In other instances, the static hierarchical IC design may be a layout design containing layout IC components. The computer system may further provide an interface and functionality to switch between the schematic and layout designs. The user's static hierarchical IC design and consequently the rotating hierarchical pcells may include multiple hierarchical levels. In this disclosure, the root level is designated as level_zero and the lower levels as level_one, level_two, and so on; and the leaf level is designed as level_n.

In a next step 302, the computer system may receive instruction from the user to instantiate level_zero hierarchical rotating pcell. In addition to the instantiation instruction for instantiating level_zero hierarchical rotating pcell, the user may specify the parameters of the top level static cell of the user's static hierarchical IC design. In some embodiments, the parameters may include library name, cell name, and view name. The library name may identify the library of top level static cell of the user's static hierarchical IC design. The cell name may indicate the level of the user's static cell, which, in this embodiment may be the top level static cell. For example, the cell name for the level_zero static cell may be "top" to indicate the top level static cell. The view name may indicate either the layout or schematic view of static cell. If the view name is "layout," the static cell may be a layout cell and if the view name is "schematic," the static cell may be schematic cell. In addition to these parameters, the computer system may also receive an angle parameter from the user. The angle parameter may indicate an angle for the level_zero hierarchical rotating pcell must be rotated.

In response to receiving the aforementioned instantiation instruction and the parameters, the computer system may generate a submaster of level_zero hierarchical rotating pcell. Within the submaster of the level_zero hierarchical rotating pcell, there may be an executable code (for example, a SKILL/SKILL+code) that the computer system may execute the functionalities described herein. For instance, the computer system may execute the SKILL code in the level_zero hierarchical rotating pcell to retrieve information from the master of the user's level_zero static cell based on at least one of the library name, cell name, and view name parameters. The computer system may identify the master of user's static level_zero cell based on at least one of these parameters. From the master of the user's static level_zero cell, the computer system may execute the SKILL code to copy the level_zero shape to the instantiated level_zero hierarchical rotating pcell. Furthermore, the computer system may execute the SKILL code in the level_zero hierarchical rotating pcell to rotate the level_zero shape by the angle parameter. One having ordinary skill in the art understands that the aforementioned SKILL code is merely exemplary, and the computer system may execute other types of executable code to achieve the above described functionality. For instance, other non-limiting examples of executable codes may include Python for use with PyCell-based parameterized cells.

In a next step 303a, the computer system may instantiate level_one hierarchical rotating pcell. The computer system may further execute the SKILL code in the level_zero hierarchical pcell to retrieve an instance of the user's level_one static cell within the user's level_zero static cell. Once the computer system retrieves the user's level_one static cell within the level_zero static cell, the computer system may execute the SKILL code in the level_zero hierarchical rotating pcell to instantiate a level_one hierarchical rotating pcell at the location of the level_one static cell rotated by the angle parameter. In other words, the level_zero hierarchical rotating pcell may reinstantiate itself at location rotated by the angle parameter within the level_zero hierarchical rotating pcell. In yet another words, the level_zero hierarchical rotating pcell and the level_one rotating pcell may be generated from the same supermaster. After instantiating the level_one hierarchical rotating pcell, the computer system may execute the SKILL code in the level_one hierarchical rotating pcell to retrieve one or more pieces of information from the corresponding static level_one pcell such that the level_one hierarchical rotating pcell is instantiated with correct parameters. After the computer system executes step 303a, the level_one hierarchical rotating pcell for the corresponding level_one static pcell may have been instantiated. If the level_one hierarchical pcell is a at leaf node, then the computer system may follow the flow 310a to re-execute step 303a to generate another level_one hierarchical pcell. However, if the level_one hierarchical pcell is not at a leaf node, the computer system may execute a next step 303c.

In the next step 303b, the computer system may instantiate a level_two hierarchical rotating pcell. The computer system may instantiate may instantiate the level_two hierarchically rotating pcell in response to determining existence of a level_two static cell within the level_one static cell in the user's static hierarchical IC design. In other words, the level_zero or level_one hierarchical rotating pcell may reinstantiate itself at the location of the level_two static cell, wherein the location is rotated based upon the angle parameter. After instantiating the level_two hierarchical rotating pcell, the computer system may execute the SKILL code in the level_two hierarchical rotating pcell to retrieve one or more pieces of information from the corresponding static level_two cell such that the level_two hierarchical rotating pcell is instantiated with correct parameters. If the level_two hierarchical pcell is a at leaf node, then the computer system may follow the flow 310b to re-execute step 303b to generate another level_two hierarchical pcell. Furthermore, if the level_two hierarchical rotating pcell is the last pcell to be instantiated in its hierarchy, the computer system may follow the flow 320a to generate a next level_one hierarchical rotating pcell and further execute other recursive steps.

The computer system may therefore recursively transverse every node of the user's static hierarchical design. For every static cell in the user's design, the computer system may instantiate a hierarchical rotating pcell with parameters from the user's static hierarchical design. Furthermore, the computer system may rotate the shapes at every level of the hierarchical rotating pcell based upon the angle parameter received from the user. After one or more such recursive steps, the computer system may execute 303n to generate leaf level or level_n hierarchical rotating pcells with processes similar to the hierarchical rotating pcells hierarchically higher than the leaf level hierarchical rotating pcells. In some embodiments, the level_n may comprise geometric shapes, and the computer system may rotate the geometry based on the angle parameter. Therefore, compared to the conventional EDA tools which flatten hierarchical IC design for a leaf level geometric rotation, the computer system provides a novel functionality of rotating an instance itself.

Figure 4:
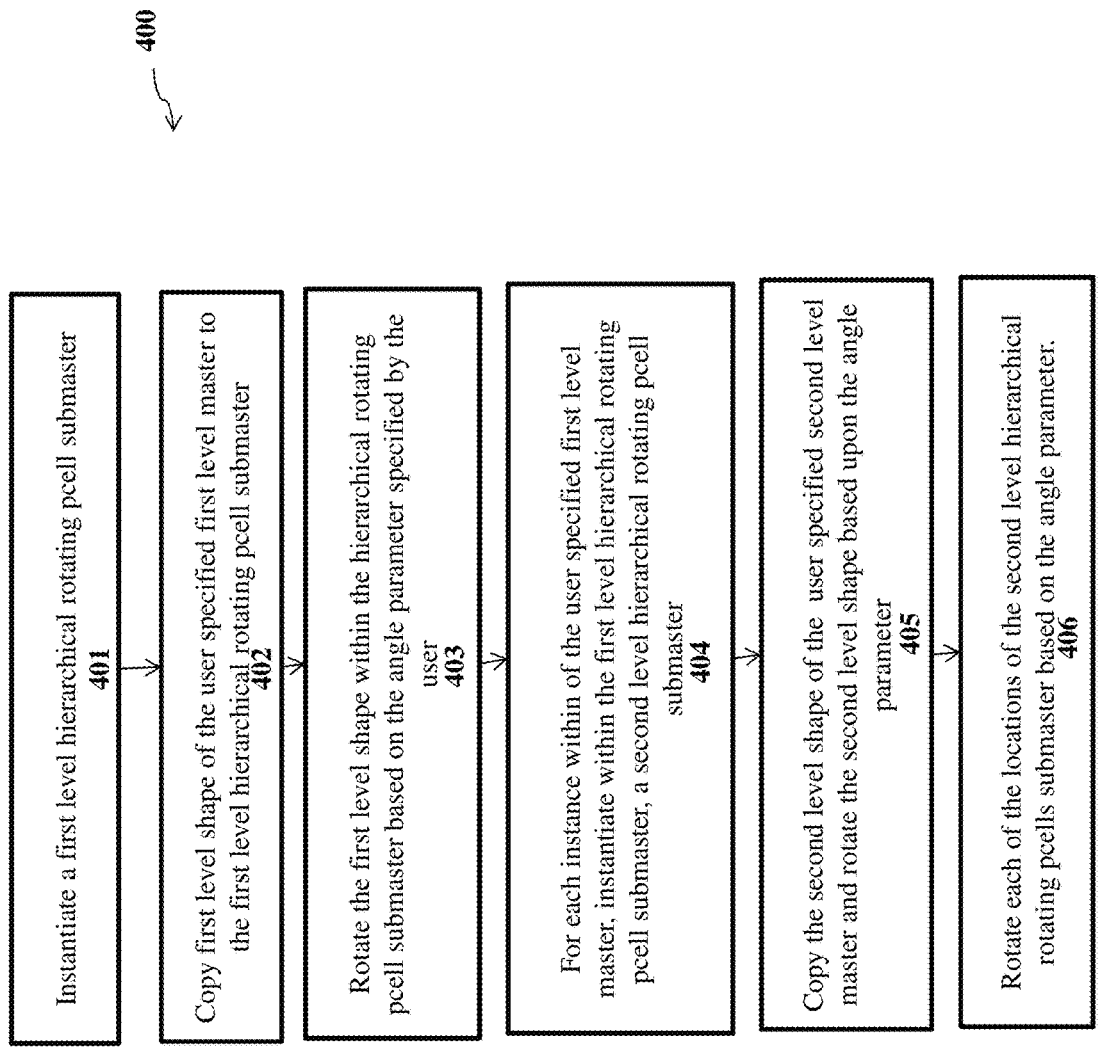
FIG. 4 shows an exemplary method for generating hierarchical rotating pcells, according to an exemplary embodiment.

FIG. 4 shows an exemplary method 400 of generating hierarchical rotating pcells, according to an exemplary embodiment. Although multiple computer systems and multiple databases may implement the various steps of the exemplary method 400, the following describes, for brevity, an electronic design automation (EDA) tool implementing the method 400. Furthermore, one having ordinary skill in the art understands that the method 400 may implement other alternative or additional steps than the one described below, and may skip one or more of the steps described below.

In a first step 401, the EDA tool may instantiate a first level hierarchical rotating pcell submaster. In some embodiments, the EDA tool may instantiate the first level hierarchical rotating pcell submaster based upon receiving an instruction from a user. For example, the first level hierarchical rotating pcell may be a top level pcell, and the user may instruct the EDA tool to instantiate the first level hierarchical rotating pcell using parameters of a top level static cell. In other embodiments, the EDA tool may instantiate the first level hierarchical rotating pcell in response to encountering an instance of a first level static cell within a static cell hierarchically above the first level static cell.

The EDA tool may instantiate the first level hierarchical rotating pcell submaster based upon a first set of parameters. In the embodiments where the user instructs the EDA tool to generate the hierarchical rotating pcell submaster, the user may provide the first set of parameters. In the embodiments wherein the EDA tool instantiates the first level hierarchical rotating pcell in response to encountering an instance of the first level static cell within a static cell hierarchically above the first level static cell, the EDA tool may retrieve the first set of parameters from the first level static pcell. In some embodiments, the first set of parameters may include a library name of the first level static cell master, a cell name of the first level static pcell, and a view name of the first level static cell. In addition to the first set of parameters, the EDA tool may also receive an angle parameter from the user, wherein the angle parameter may indicate the rotation angle for the first level hierarchical rotating pcell submaster, and more broadly, for the IC design using the hierarchical rotating pcell.

In a next step 402, the EDA tool may copy first level shape of the user specified first level master to the first level hierarchical rotating pcell submaster. More specifically, the EDA tool may execute a SKILL code within the instantiated first level hierarchical rotating pcell submaster to access the user specified first level master to retrieve one or more pieces of information from user specified first level master. The user specified first level master may be the master of the user's first level static cell corresponding to the first level hierarchical rotating pcell submaster. The one or more pieces of information may include the first level shape of the user's first level static cell. One having ordinary skill in the art understands that the aforementioned SKILL code is merely exemplary, and the computer system may execute other types of executable code to achieve the above described functionality. For instance, other non-limiting examples of executable codes may include Python for use with PyCell-based parameterized cells.

In a next step 403, the EDA tool may rotate the first level shape within the hierarchical rotating pcell submaster based on the angle parameter specified by the user. The user may have specified the angle parameter at the beginning of the method 400 to indicate that the design containing the hierarchical rotating pcells must be rotated by a certain angle.

In a next step 404, the EDA tool may, for each instance within the user specified first level master, instantiate within the first level hierarchical rotating pcell submaster, a second level hierarchical rotating pcell submaster. For instance, within the user's static design, the first level static cell may have multiple instances of second level static cells; and the EDA tool may have to generate the corresponding second level hierarchical rotating pcells. To do so, the EDA tool may recursively traverse through all of the multiple instances of the second level static cells and generate the corresponding second level hierarchical rotating pcells based upon the respective parameters. In a next step 405, the EDA tool may, for each second level static cell, copy the second level shape from the user specified second level master and rotate the second level shape based on the angle parameter. Furthermore, in a next step 406, the EDA tool may rotate each of the locations of the second level hierarchical rotating pcells based on the angle parameter.

Therefore, the EDA tool, upon execution of the method 400, may generate an IC design formed by hierarchical rotating pcells, wherein the IC design is rotated by the angle parameter. Furthermore, the EDA tool may rotate the location of the lower level instances of hierarchical rotating pcells such that the lower level pcells are placed correctly based on the rotation of the higher level parent hierarchical rotating pcell. Also, the EDA tool may rotate the shape of the lower level hierarchical rotating pcells in based on the angle parameter such that the orientation of the lower level hierarchical rotating pcells is in accordance with the parent hierarchical rotating pcell.

Figure 5A:
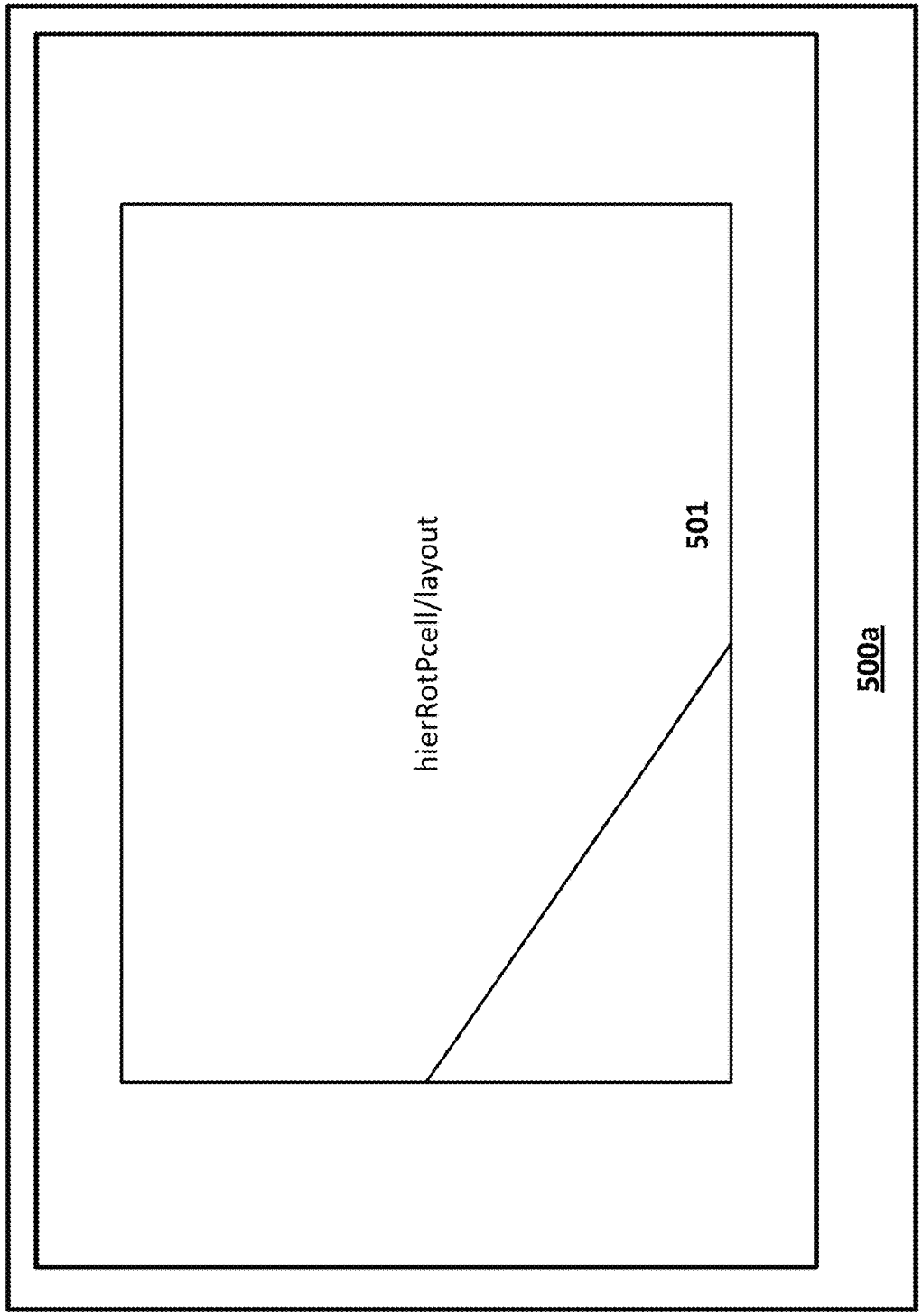
FIG. 5A shows an exemplary GUI rendering a level_zero layout display showing a top level hierarchical rotating pcell layout, according to an exemplary embodiment.
Figure 5C:
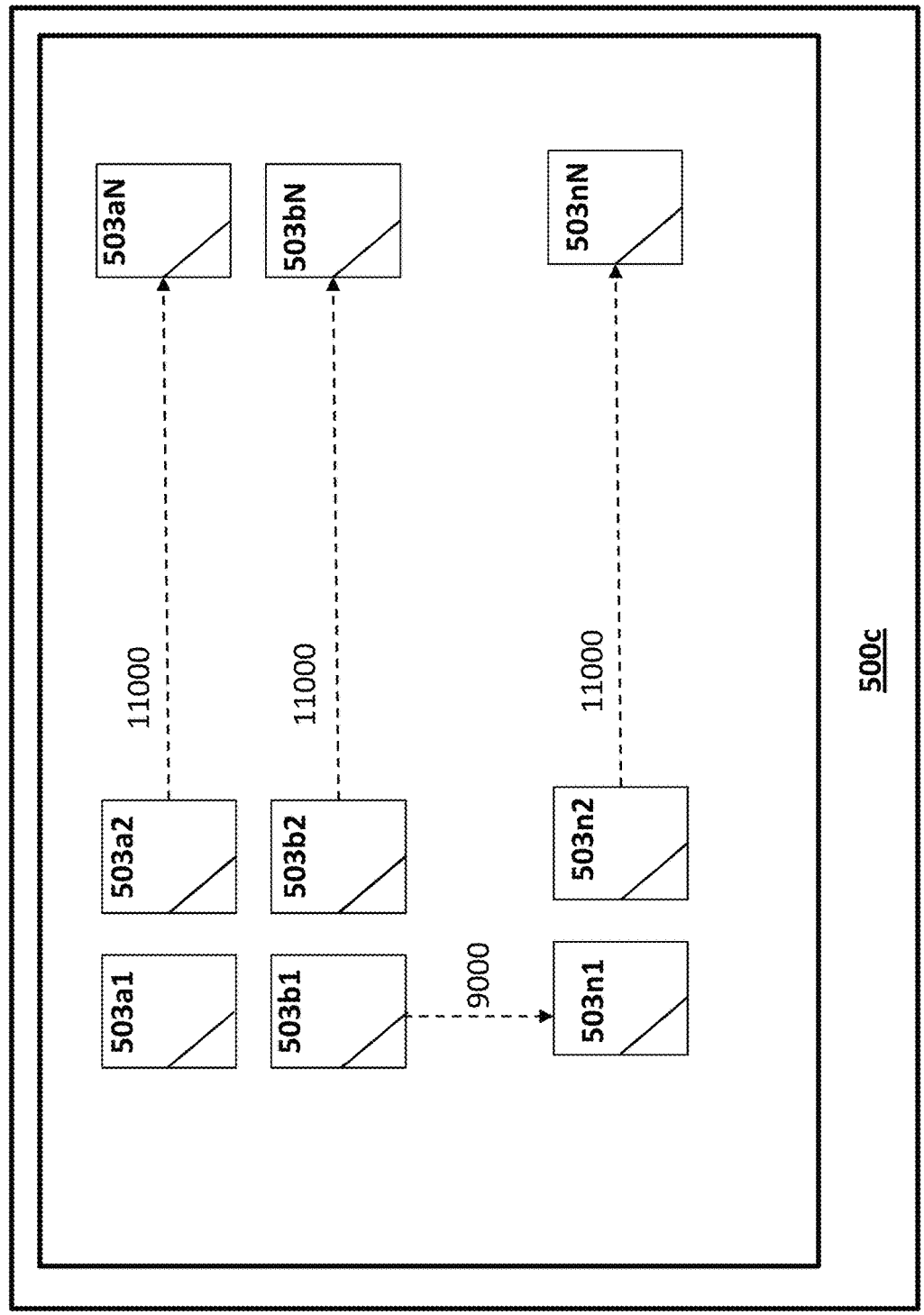
FIG. 5C shows an updated exemplary GUI rendering a level_two layout display showing bottom level hierarchical rotating pcells, according to an exemplary embodiment.
Figure 5D:
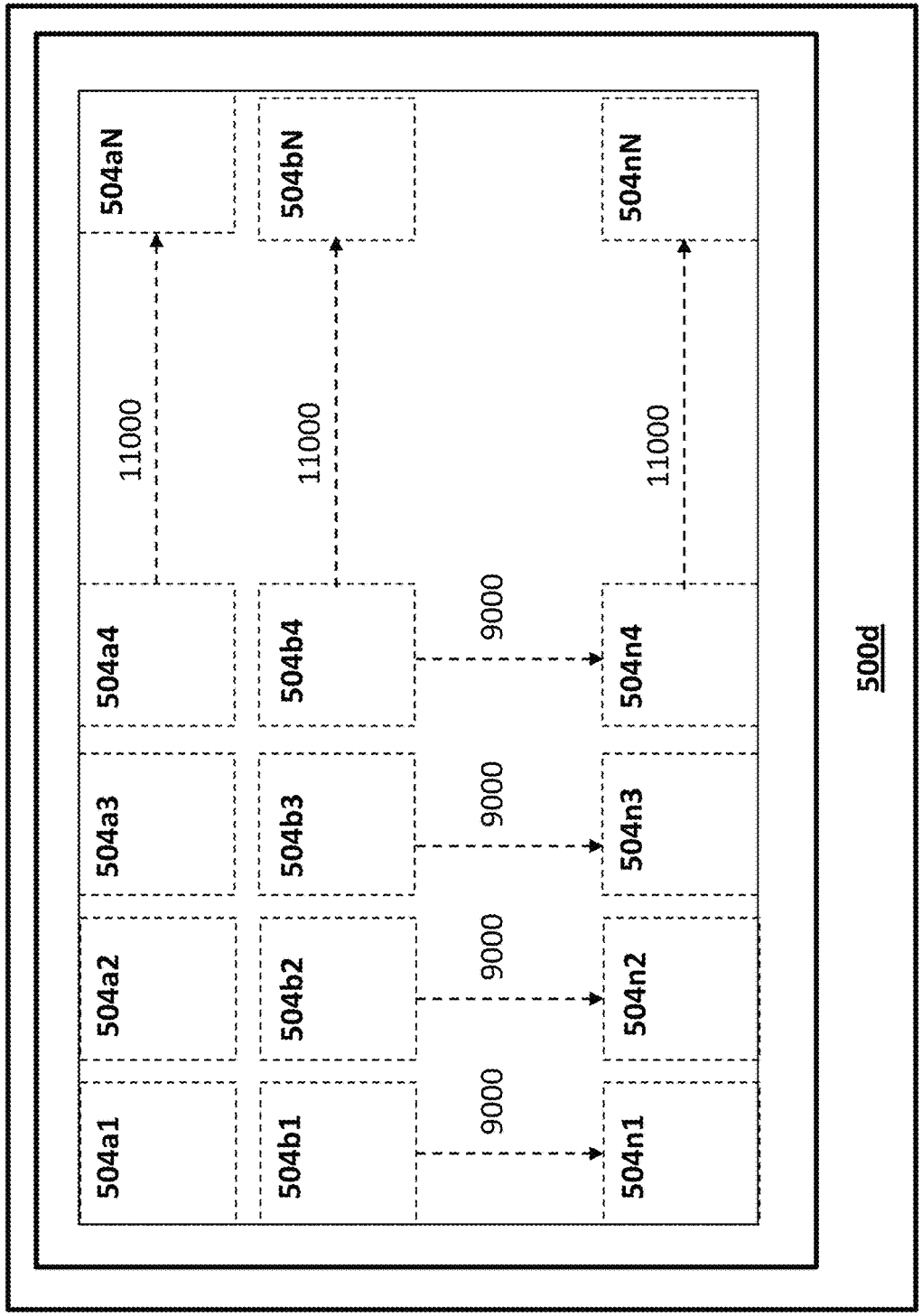
FIG. 5D shows an updated exemplary GUI rendering a level_three layout display showing leaf level geometry, according to an exemplary embodiment.

FIG. 5A shows an exemplary graphical user interface (GUI) 500a rendered by an EDA tool during the process of generating level_zero hierarchical rotating pcells. The exemplary GUI 500a shows a level_zero hierarchical rotating pcell 501 generated by the EDA tool from a level_zero user provided static cell. FIG. 5B shows an exemplary updated GUI 500b rendered by the EDA tool while generating level_one hierarchical rotating pcells from level_one user provided static cells. For example, the exemplary updated GUI 500b shows level_one hierarchical rotating pcells 502. FIG. 5C shows an exemplary updated GUI 500c rendered by the EDA tool while generating level_two hierarchical rotating pcells from user provided level_two cells. For example, the exemplary GUI 500c shows an array of level_two hierarchical rotating pcells 503. FIG. 5D shows an updated exemplary GUI 500d rendered by the EDA tool while generating level_three hierarchical rotating pcells. For example, the updated exemplary GUI 500d shows an array of level_three hierarchically rotating pcells. In the embodiment shown, the level_three hierarchical rotating pcells may not include instances of pcells hierarchically below the level_three hierarchical rotating pcells. In other words, the level_three hierarchical pcells may be the leaf nodes of the IC design formed by the hierarchical rotating pcells. The exemplary GUIs 500a, 500b, 500c, 500d therefore may allow the user to see different hierarchical levels of the IC design formed by the hierarchical rotating pcells 501, 502, 503.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
   instantiating, by a computer system, a hierarchical rotating parametrized cell based on a first set of parameters to generate a first level hierarchical rotating parametrized cell;
   retrieving, by the computer system using at least one parameter of the first set of parameters, a first level shape from a master of a first level static cell of a static hierarchical integrated circuit (IC) design;

rotating, by the computer system, the retrieved first level shape within the first level hierarchical rotating parametrized cell based on an angle parameter;

determining, by the computer system, that the first level static cell contains a second level static cell, wherein the second level static cell is hierarchically below the first level static cell;

retrieving, by the computer system, a second level shape and a second set of parameters from a master of a second level static cell of the static hierarchical IC design;

reinstantiating, by the computer system, the hierarchical rotating parametrized cell based on the second set of parameters to generate a second level hierarchical rotating parametrized cell; and rotating, by the computer system, the retrieved second level shape within the second level hierarchical rotating parametrized cell based on the angle parameter.

2. The method of claim 1, further comprising:

receiving, by the computer system, an instruction from a user to instantiate the first level hierarchical rotating parametrized cell, wherein the instruction comprises the first set of parameters including the angle parameter.

3. The method of claim 1, further comprising:

rotating, by the computer system, a location of the second level hierarchical rotating parametrized cell within the first level hierarchical rotating parametrized cell based on the angle parameter.

4. The method of claim 1, further comprising:

determining, by the computer system, that the second level static cell contains a third level static cell, wherein the third level static cell is hierarchically below the second level static cell;

retrieving, by the computer system, a third level shape and a third set of parameters from a master of a third level static cell of the static hierarchical IC design;

reinstantiating, by the computer, the hierarchical rotating parametrized cell based on the third set of parameters to generate a third level hierarchical rotating parametrized cell; and rotating, by the computer system, the retrieved third level shape within the third level hierarchical rotating parametrized cell based on the angle parameter.

5. The method of claim 1, wherein the first level hierarchical rotating parametrized cell is at a top level of an IC design formed by hierarchical rotating parametrized cells.

6. The method of claim 1, wherein the second level hierarchical rotating parametrized cell is at a leaf level of an IC design formed by hierarchical rotating parametrized cells.

7. The method of claim 1, wherein a submaster of the second level hierarchical rotating parametrized cell is generated within the submaster of the first level hierarchical rotating parametrized cell.

8. The method of claim 1, wherein the hierarchically rotatable parametrized cell represents a schematic view or a layout view.

9. The method of claim 1, further comprising:

rendering, by the computer system, a first level graphical user interface (GUI) showing an instance of the first level hierarchical rotating parametrized cell; and updating, by the computer system, the first level GUI to generate a second level GUI showing an instance of the second level hierarchical rotating parametrized cell.

10. A system for generating hierarchical rotating parametrized cells, the system comprising:

one or more computers comprising a non-transitory machine-readable media configured to store a plurality of records of a plurality of circuit components forming a at least a portion of an integrated circuit (IC) design; and at least one computer of the one or more computers, the at least one computer coupled to the non-transitory machine readable media storing the plurality of records and comprising a processor configured to:

instantiate a hierarchical rotating parametrized cell based on a first set of parameters to generate a first level hierarchical rotating parametrized cell;

retrieve, using at least one parameter of the first set of parameters, a first level shape from a master of a first level static cell of a static hierarchical IC design;

rotate the retrieved first level shape within the first level hierarchical rotating parametrized cell based on an angle parameter;

determine that the first level static cell contains a second level static cell, wherein the second level static cell is hierarchically below the first level static cell;

retrieve a second level shape and a second set of parameters from a master of a second level static cell of the static hierarchical IC design;

reinstantiate the hierarchical rotating parametrized cell based on the second set of parameters to generate the second level hierarchical rotating parametrized cell; and rotate the retrieved second level shape within the second level hierarchical rotating parametrized cell based on the angle parameter.

11. The system of claim 10, wherein the processor is further configured to:

receive an instruction from a user to instantiate the first level hierarchical rotating parametrized cell, wherein the instruction comprises the first set of parameters including the angle parameter.

12. The system of claim 10, wherein the processor is further configured to:

rotate a location of the second level hierarchical rotating parametrized cell within the first level hierarchical rotating parametrized cell based on the angle parameter.

13. The system of claim 10, wherein the processor is further configured to:

determine that the second level static cell contains a third level static cell, wherein the third level static cell is hierarchically below the second level static cell;

retrieve a third level shape and a third set of parameters from a master of a third level static cell of the static hierarchical IC design;

reinstantiate the hierarchical rotating parametrized cell based on the third set of parameters to generate a third level hierarchical rotating parametrized cell; and rotate the retrieved third level shape within the third level hierarchical rotating parametrized cell based on the angle parameter.

14. The system of claim 10, wherein the first level hierarchical rotating parametrized cell is at a top level of an IC design formed by hierarchical rotating parametrized cells.

15. The system of claim 10, wherein the second level hierarchical rotating parametrized cell is at a leaf level of an IC design formed by hierarchical rotating parametrized cells.

16. The system of claim 10, wherein a submaster of the second level hierarchical rotating parametrized cell is generated within the submaster of the first level hierarchical rotating parametrized cell.

17. The system of claim 10, wherein the hierarchically rotatable parametrized cell represents a schematic view or a layout view.

18. The system of claim 10, wherein the processor is further configured to:

render a first level graphical user interface (GUI) showing an instance of the first level hierarchical rotating parametrized cell; and update the first level GUI to generate a second level GUI showing an instance of the second level hierarchical rotating parametrized cell.

19. A computer readable non-transitory medium containing one or more computer instructions which, when executed by a processor cause the processor to:

receive an instantiation of a top level hierarchical rotating parametrized cell corresponding to a top level static cell of a hierarchical static integrated circuit (IC) design;

receive an angle parameter by which a hierarchical rotating parametrized cell based IC design corresponding to the hierarchical static IC design should be rotated;

recursively identify, lower level static cells in the hierarchical static IC design and recursively generate a corresponding hierarchical rotating parametrized cell for each of the lower level static cells; and recursively rotate each one corresponding hierarchical rotating parametrized cell based on the angle parameter.

20. The computer readable non-transitory medium of claim 19, wherein each said corresponding hierarchical rotating parametrized cell represents a schematic view or a layout view.

\* \* \* \* \*